Nov. 2, 1943.   M. P. HOLMES   2,333,180
POWER OPERATED CHUCK
Filed March 3, 1941   2 Sheets-Sheet 1
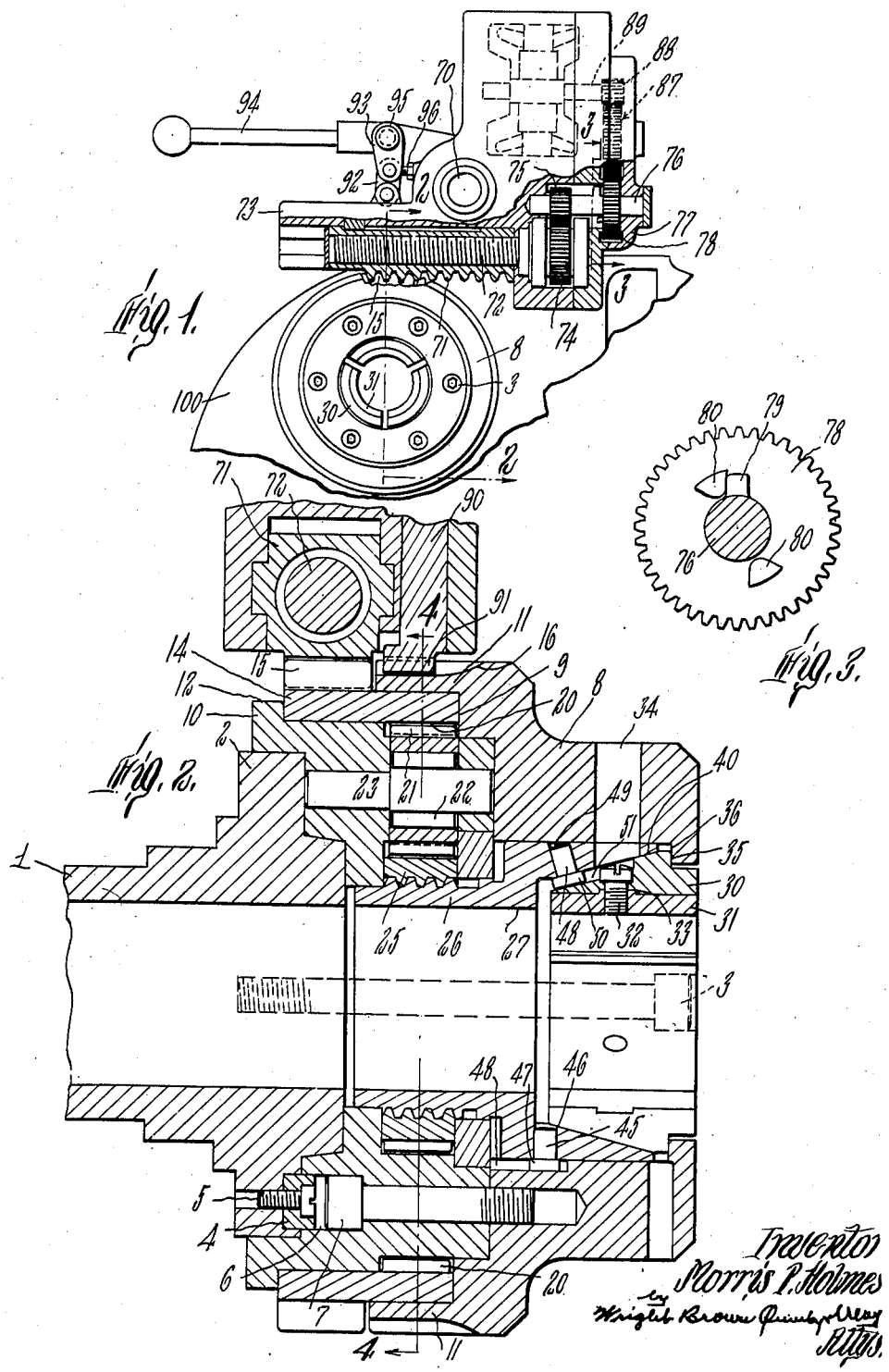

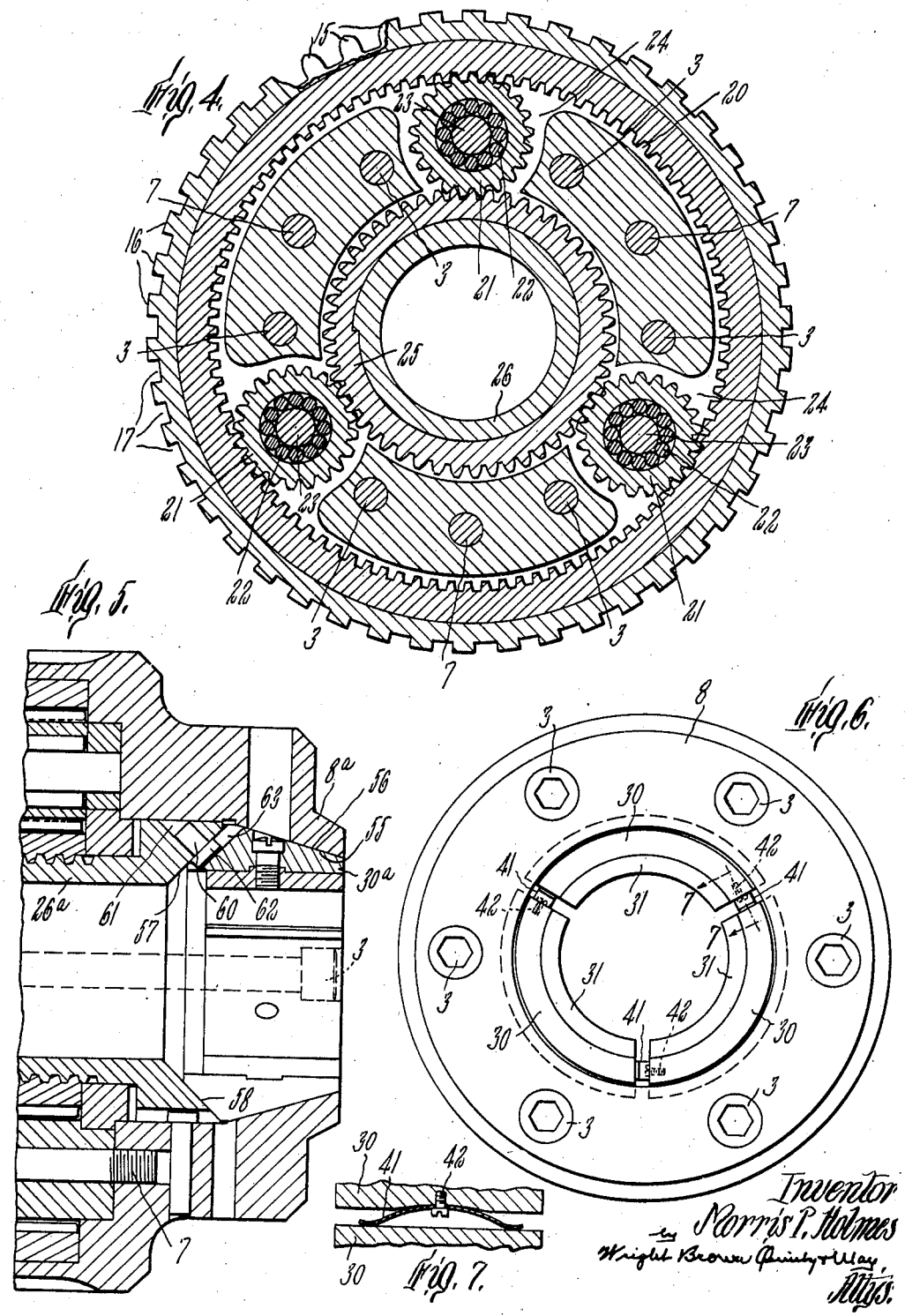

Patented Nov. 2, 1943

2,333,180

UNITED STATES PATENT OFFICE 2,333,180

POWER OPERATED CHUCK

Morris P. Holmes, Claremont, N. H., assignor to Jones & Lamson Machine Company, Springfield, Vt., a corporation of Vermont Application March 3, 1941, Serial No. 381,477

2 Claims. (Cl. 279—1)

This invention relates to chucks and more particularly to those suitable for holding bar or tubular stock. When the speed of operation is high and the cuts are heavy, difficulty has been experienced in holding the work in manually operated chucks. This invention, therefore, has for an object to provide a chuck which is operated by power.

For a more complete understanding of this invention, reference may be had to the accompanying drawings in which Figure 1 is a fragmentary front elevation partly broken away and in section of a work spindle and its immediate mounting and showing the chuck actuating mechanism.

Figures 2 and 3 are detail sections to a larger scale on lines 2—2 and 3—3, respectively, of Figure 1.

Figure 4 is a detail section on line 4—4 of Figure 2.

Figure 5 is a view similar to a portion of Figure 2, but showing a modified construction.

Figure 6 is a front elevation of the construction of Figure 2.

Figure 7 is a detail section on line 7—7 of Figure 6.

Referring first to Figure 2, at 1 is shown a rotary work spindle of a lathe or the like having at its forward end a standard spindle nose 2 to which may be secured the chuck. This chuck, as shown best in Figures 1, 2 and 4, is secured to the spindle nose by six screws 3 which extend entirely through the chuck body and are threaded into the spindle nose. The chuck is secured for rotation to the spindle by means of a driving lug 4 (see Figure 2) secured by a screw 5 to the outer marginal portion of the spindle nose, this lug 4 engaging in a counterbored hole 6 in the base of which is seated one of a plurality of screws 7 which serve to secure together a forward body portion 8 and a rearward body portion 10 of the chuck body. The forward body portion 8 is provided with a recess 9 in its rear face surrounded by a rearwardly extending concentric flange 11. At the rear end of the rearward body portion 10 it has an outwardly extending flange 12.

Journaled on the outer face of the rearward body portion 10, and forwardly of the flange 12, is a ring 14 which projects into the recess 9 and inwardly of the rearwardly directed flange 11. About the rear portion of the ring 14, it is provided with external gear teeth 15 extending outwardly back of the edge of the flange 11 and this flange 11 is also provided with external teeth 16 formed between cuts 17 therein. The forward portion of the ring 14 is provided with internal gear teeth at 20 and these teeth mesh with the teeth of pinions 21 mounted on roller bearings 22, each carried by a stud shaft 23 extending forwardly from the rear body member 10 and through recesses 24 in this body member within which the pinions 21 are positioned. While three pinions 21 are shown, there might be more or less as desired. Each one of these pinions also meshes with external gear teeth of a nut 25 through which is threaded a sleeve element 26. This sleeve element 26 is arranged coaxially with the chuck and the spindle, and has an internal bore 27 through which the stock gripped by the chuck may extend. It will be evident from this construction that by rotation of the ring 14 by means engaging its external teeth, the pinions 21 are also rotated and that the rotation of these pinions rotates the nut 25, producing an axial motion of the sleeve element 26. Such axial motion of the sleeve element is employed to close and open the chuck.

For engaging and gripping the work there may be employed a plurality of jaws 30 and for the purpose of adapting these jaws to take work of different diameters, they are shown as provided with removable pads 31 on their inner faces, the pads being shown as secured to the jaws 30 as by means of screws 32, these pads also preferably having thrust ribs 33 which may fit into corresponding slots in the inner faces of the jaws.

Access may be had to the screws 32 from outside the chuck through holes 34 positioned opposite thereto through the forward body portion 8. Outwardly extending face portions 35 on the jaws, engaging matingly inwardly extending face portions 36 of the forward body portion 8, serve to retain the jaws against removal forwardly from the chuck body, and in order to close them toward each other to grip the work and to hold them against undesired rearward motion, the forward extremity of the sleeve 26 is provided with a flaring or tapered inner face as at 40 mating a reversely tapered external face of each of the jaw members.

The jaw members may be normally pressed away from each other into extended position as by means of leaf springs shown at 41 in Figures 6 and 7. Such a leaf spring may be secured as by a screw 42 to one edge of a jaw member, the free ends of the spring bearing against the adjacent edge of the next jaw member in the series. As shown three jaw members are employed, though two or more than three might be used if desired.

In order to hold the work for rotation with the chuck, means are provided for preventing relative rotation between the sleeve 26 and the chuck body. As shown in Figure 2, such means comprises a plug 45 held in a perforation 46 in the sleeve 26 and having a head 47 riding in a key slot 48 in the forward jaw member 8. One or more of the jaws is also keyed to the sleeve 26 as by a pin 48 seated in a hole 49 therein and having a head 50 riding in a slot 51 in the jaw member. The jaws are thus keyed to the sleeve 26, the sleeve 26 is keyed to the forward chuck body member 8, this chuck body member 8 is secured by the screws 7 to the rear chuck body member 10, and this chuck body member 10 is keyed by the lug 4 to the spindle nose and to the spindle 1. The reversely tapered faces of the sleeve 26 and the jaws cause outward motion axially, of the sleeve to force the jaws inwardly to engage the work while rearward motion of the sleeve 26 permits these jaws 30 to be opened up by the action of the springs 41.

In Figure 5 a modified interconnection between the axial movable sleeve and the jaw members by which the jaw members are moved into gripping engagement with the stock has been illustrated. Referring to this figure, it will be noted that instead of having tapering engaging surfaces between the jaws and the actuating sleeve as in Figure 2, the tapering surfaces are between the jaws 30a and the inner face of the forward chuck body 8a, such mating tapering faces being shown at 55 and 56. With this arrangement an axial motion of the jaws 30a with respect to the chuck body is employed to effect tightening and loosening of the jaws on the work. The jaws are thus connected to receive such axial motion from the sleeve 26a. As shown the forward extremity of the sleeve 26a is tapered at a sharp angle as at 57, mating the tapered rear face 58 of each of the jaws, but there is a keyed connection between the jaws and the sleeve 26a to prevent relative rotation therebetween and also to permit axial motion of the jaws from and toward each other. This keyed connection comprises a plug 60 seated in a perforation 61 of the sleeve 26a and having a head 62 riding in a slot 63 in the rear face of one of the jaws 30a.

As before noted, it is desired to open or close the clutch by power, and a power operated mechanism is thus provided for rotating the ring 14 in either direction. This power means may be substantially as shown in the Highberg et al. Patent No. 2,224,633 granted December 10, 1940. It comprises a power unit pivoted for rocking motion about the axis of a sleeve 70 as shown in Figure 1, mounted on some portion of the machine frame in such a manner as to permit a rack bar 71 to be swung down into or upwardly out of operative engagement with the external teeth 15 of the ring 14. This rack bar 71 is shown as having threaded thereinto a screw shaft 72 journaled in a frame member 73 of the power mechanism. This screw shaft 72 has fixed thereto a gear 74 with which meshes a pinion 75 of a shaft 76. This shaft 76 extends outwardly into a cover member 77 for the casing 73 and within this cover member has journaled thereon a gear 78 (see Figures 1 and 3). The shaft 76 is provided with a lug 79 thereon which may be struck by either of a pair of lugs 80 carried by the gear 78, so that when this gear is rotated in either direction to a sufficient extent for one of its lugs 80 to engage the lug 79, the shaft 76 will thereafter be driven by rotation of the gear 78. This gear 78 is connected through an intermediate gear train indicated generally at 87 with the pinion 83 of the armature 89 of a motor carried by the casing 73. This motor armature 89 may be controlled to rotate in either direction as desired so that when the rack bar 71 has been lowered into position to engage the external teeth of the ring 14, it may be started in operation to start the axial motion of the rack bar with a sudden blow through the impingement of one of the lugs 80 on the lug 79 so as to close or release the chuck jaws from the work.

As in the Highberg et al. patent to which reference has been made, means may be provided for locking the chuck against rotation when the chuck is to be opened or closed and there may be provided an interlock with the spindle drive clutch to hold the clutch in neutral position as shown in that patent. The means for locking the chuck against rotation is, however, slightly different as herein shown from that of the Highberg et al. patent for the reason that the locking engagement is directly with the chuck body rather than with a separate plate. As herein shown the lock comprises a locking member 90 having teeth 91 in its lower end which may engage between the teeth 16 in the flange 11 of the chuck body. This member 90 may be connected for up and down motion, its upper end being pivotally connected to the toggle link 92 which is connected to the mating toggle link 93 adapted to be turned by rocking of the handle 94 about its fulcrum at 95. An adjustable stop 96 may be provided to hold the toggle links just beyond their "made" position, which is that shown in Figure 1, and in which the power operated mechanism is in operative position and the locking member 90 holds the chuck against rotation.

Whenever it is desired to open or close the clutch, it is only necessary to swing the power mechanism down into the position shown in Figure 1 with relation to the chuck which it is desired to operate, and then start the motor running in the desired direction to rotate the ring 14 in the proper direction to open or close the clutch jaws. When the desired operation has been accomplished, the power mechanism is swung back out of the way and the normal functioning of the machine may then be effected.

From the foregoing description of certain embodiments of this invention, it should be evident to those skilled in the art that various changes and modifications might be made without departing from the spirit or scope of this invention.

I claim:

1. In combination, a rotary chuck body comprising a forward member provided with a concentric recess in its rear face and a marginal rearwardly extending concentric flange, a rearward member secured to said forward member spaced from said flange and having an outwardly extending circumferential flange, a ring journaled on said rearward member and forwardly of said outwardly extending flange and inwardly of said rearwardly extending flange, said ring having external gear teeth rearwardly of said rearwardly extending flange and internal gear teeth within said recess, said rearward body member having a recess in line with said internal gear teeth, a pinion journaled in said rearward body member recess and having teeth meshing with said internal gear teeth, an externally toothed nut, an element on which said nut is threaded, work engaging jaws carried by said forward body member for motion toward and from the axis of said chuck to grip and release work positioned between said jaws, operative connections between said jaws and element causing axial motion of said element to move said jaws, and power means selectively engageable with the external teeth of said ring for rotating said ring in either direction.

2. In combination, a rotary chuck body comprising a forward member provided with a concentric recess in its rear face and a marginal rearwardly extending concentric flange, a rearward member secured to said forward member spaced from said flange and having an outwardly extending circumferential flange, a ring journaled on said rearward member and forwardly of said outwardly extending flange and inwardly of said rearwardly extending flange, said ring having external gear teeth rearwardly of said rearwardly extending flange and internal gear teeth within said recess, said rearward body member having a recess in line with said internal gear teeth, a pinion journaled in said rearward body member recess and having teeth meshing with said internal gear teeth, an externally toothed nut, an element on which said nut is threaded, work engaging jaws carried by said forward body member for motion toward and from the axis of said chuck to grip and release work positioned between said jaws, operative connections between said jaws and element causing axial motion of said element to move said jaws, power means selectively engageable with the external teeth of said ring for rotating said ring in either direction, and means engageable with said marginal rearwardly extending flange to prevent rotation of said chuck body when said power means engages the external teeth of said ring.

MORRIS P. HOLMES.